April 3, 1962 G. NATHAN 3,027,631
COUPLING DEVICE
Filed Feb. 6, 1961 2 Sheets-Sheet 1
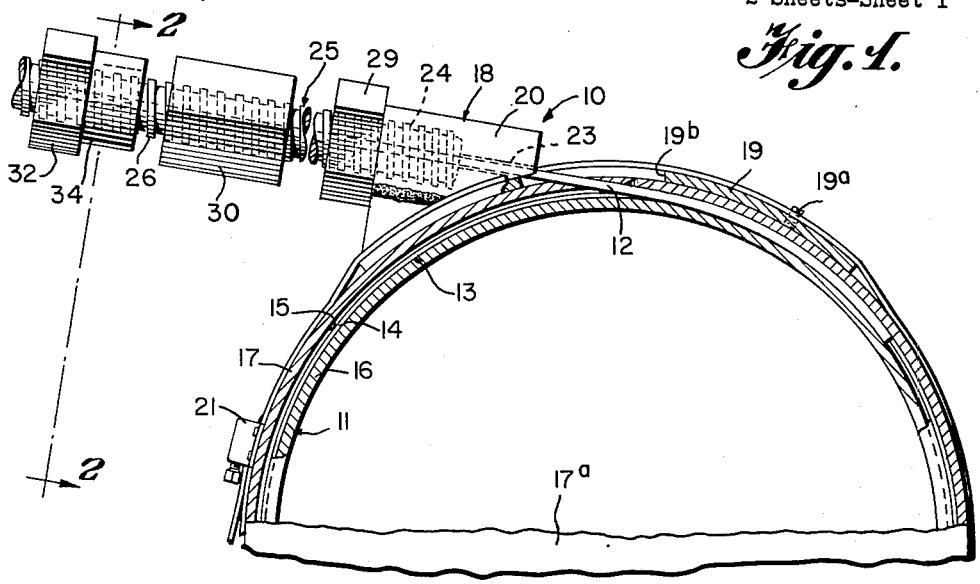
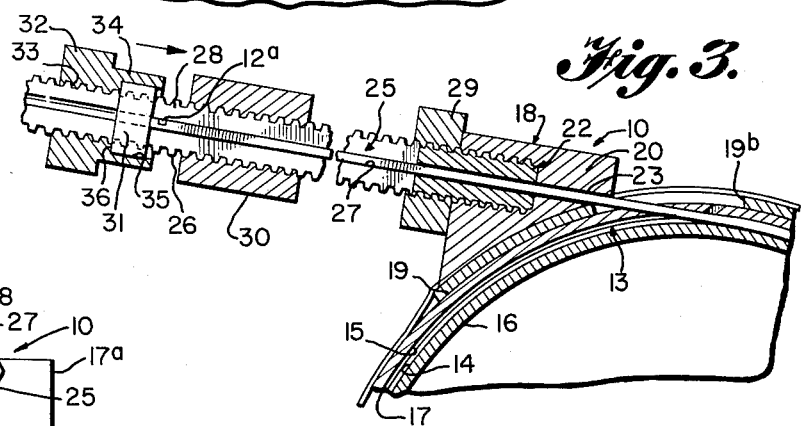
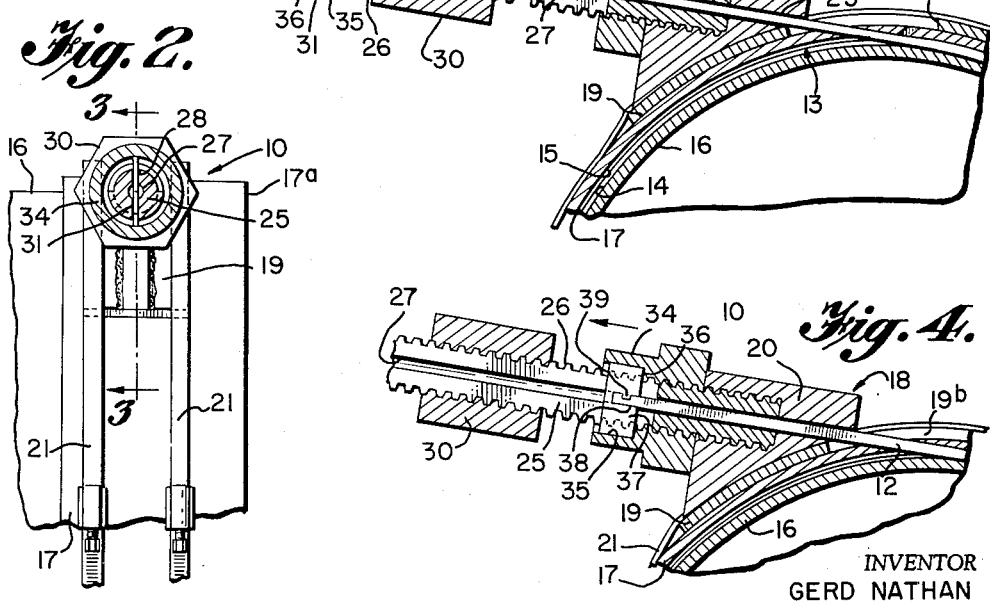
INVENTOR
GERD NATHAN
BY Martha L. Ross
AGENT April 3, 1962 G. NATHAN 3,027,631
COUPLING DEVICE
Filed Feb. 6, 1961 2 Sheets-Sheet 2

INVENTOR
GERD NATHAN

BY Martha L. Ross
AGENT

United States Patent Office 3,027,631
Patented Apr. 3, 1962

3,027,631
COUPLING DEVICE
Gerd Nathan, Falls Church, Va., assignor to Atlantic Research Corporation, Fairfax County, Va., a corporation of Virginia
Filed Feb. 6, 1961, Ser. No. 87,278
6 Claims. (Cl. 29—250)

The present invention relates in general to structural refinements in the art of installing elongated flexible fastening or locking strips in coupling recesses of couplings and withdrawing the same, and more particularly to apparatus facilitating the insertion and removal of Ortman keys and the like into and from the mating recesses of members to be interlocked together.

One effective coupling which has been developed in recent years for securing together certain separately manufactured parts of a pressure vessel or similar container is the Ortman key assembly. An Ortman key assembly essentially comprises an elongated strip of metallic bar stock, termed an Ortman key in the trade, which is seated in a curved coupling slot, usually of circular configuration, formed at a cylindrical or otherwise curved interface between two adjacent parts of the pressure vessel to be secured together by mating complemental recesses in the facing surfaces of such parts. The Ortman key when removed from the assembly normally assumes the condition of an elongated rectilinear member, but has sufficient flexibility to conform to the circular or other curved path of the coupling slot formed by the mating recesses in the parts to be assembled when inserted in the coupling slot and is of sufficient cross-sectional dimensions to substantially fill the coupling slot and securely interlock the parts against relative movement. A particularly useful application of such Ortman key assemblies is in securing elements such as the head plate or aft plate to the rocket motor case of a rocket motor assembly, and the ensuing description of specific examples of the invention will be directed to such a rocket motor assembly application.

Considerable difficulty has been experienced heretofore in inserting such Ortman keys into and removing them from the coupling slots provided for them in the parts to be interlocked together. The usual practice in inserting the Ortman key has been to drive the key into its coupling slot by inserting its leading end into the entrance opening of the slot in an exterior wall of the outer one of the parts to be joined and hammering on the opposite end of the key. Because of the length of an Ortman key required to join members of considerable circumference and the substantial unsupported span of key which would project from the entrance end of the coupling slot, frequent bending, buckling, or other damaging of the key has been experienced when it is installed in this manner. Also, use of such an installation procedure for interlocking together parts of a rocket motor assembly where the rocket motor case has a propellant therein is extremely dangerous because of the likelihood of sparks resulting from the hammering of the key, which may accidentally ignite the propellant.

An object of the present invention, therefore, is the provision of novel apparatus to facilitate installation and removal of Ortman keys and similar fastening devices into and from the coupling slots therefor in the parts to be coupled.

Another object of the present invention is the provision of novel Ortman key installing and removing apparatus which provides encasing support for the entire portion of the Ortman key projecting externally of the parts to be assembled to prevent bending, buckling, or other deformation of the key and which permits a continuous, even inserting or withdrawing force to be applied directly to the key.

Another object of the present invention is the provision of novel apparatus to be removably applied to a pressure vessel or the like, which is adaptable to either insert an Ortman key into an accommodating coupling slot provided in adjacent separable parts of the vessel or retract an Ortman key therefrom.

Other objects, advantages and capabilities of the present invention will become apparent from the following detail description, taken in conjunction with the accompanying drawings illustrating two preferred embodiments of the invention.

In the drawings:

FIGURE 1 is a side elevation of a first embodiment of an Ortman key installing and removing apparatus, shown in assembled relation on a rocket motor assembly, parts of the latter being shown in section;

FIGURE 2 is a vertical longitudinal section view taken along the line 2—2 of FIGURE 1;

FIGURE 3 is a vertical transverse section view thereof, taken along the line 3—3 of FIGURE 2;

FIGURE 4 is a fragmentary vertical longitudinal section view of the assembly conditioned to remove an Ortman key from the coupling;

Figure 5:
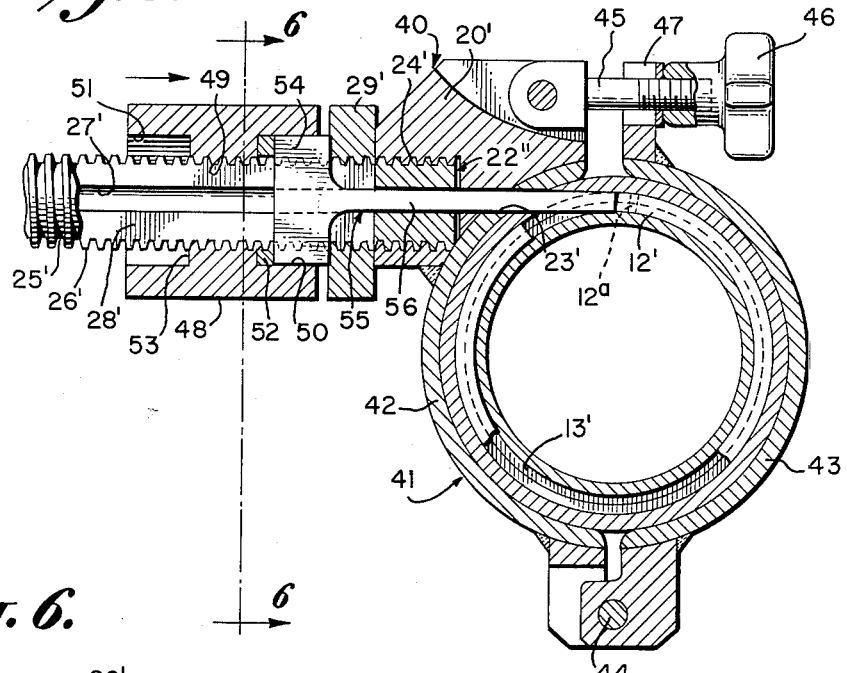
FIGURE 5 is a vertical longitudinal section view of a second embodiment of an Ortman key installing and removing apparatus constructed in accordance with the present invention.

Referring to the drawings, and particularly to the embodiment illustrated in FIGURES 1 through 4 thereof, there is illustrated an embodiment of the Ortman key installing and removing apparatus, indicated generally by the reference character 10, assembled on a rocket motor assembly 11 for installing or removing an Ortman key, designated by the reference character 12, into or from the coupling slot 13 formed by mating recesses 14 and 15 in the adjacent concentric portions of a rocket motor case 16 and the flange 17 of a head plate 17a therefor. The Ortman key installing and removing apparatus 10 includes an alignment rod guide member 18 having an arcuately curved mounting plate portion 19 shaped to conform to and butt against the exterior surface of the head plate flange 17 in generally concentric relation with the axis of the rocket motor case 16, and a boss 20 rising from the outer surface of the mounting plate portion 19 and fixed thereon as by welding or the like. If desired, threaded apertures may also be provided at suitable locations near the corners of the arcuate mounting plate portion 19 to receive set screws 19a which may be adjusted to compensate for slight out of roundness of the surface against which the mounting plate portion is to be secured. The alignment rod guide member 18 is designed to be temporarily secured onto the exterior surface of the head plate flange 17 or outer member by means such as adjustable metal retaining straps 21 extending around the head plate flange and over the lateral marginal portions of the mounting plate portion 19. The boss 20 is provided with a bore 22 having an inner constricted portion 23 and an outer enlarged, internally threaded portion 24, the constricted bore portion 23 being just large enough to slidably actuate the Ortman key 12 therein and being aligned with an elongated slot 19b in the mounting plate portion 19 to provide communication between the bore 22 and the coupling slot 13. The enlarged internally threaded portion 24 is designed to receive an elongated threaded alignment rod 25 provided with external threads 26 along its entire length and having a bore 27 extending throughout its length having a diameter corresponding substantially to the length of the diagonal cross-sectional dimension of the Ortman key 12 to slidably actuate the Ortman key therein. The alignment rod 25 is also provided with a diametric slot 28 extending transversely entirely through the alignment rod and extending from the rearmost end thereof to a point spaced slightly outwardly from the inner end of the alignment rod 25.

When the inner end of the alignment rod 25 is threaded fully into the threaded enlarged portion 24 of the bore 22, an internally threaded lock nut 29 may be run down on the external threads 26 of the alignment rod 25 until the lock nut abuts the adjacent surface of the boss 20 to increase the forces restraining the rod 25 against further rotation. An alignment nut 30, a thin rectangular installer plate 31 having a width slightly greater than the maximum diameter of the rod 25, and a pressure nut 32 having an internally threaded bore 33 and an axial extension portion 34 provided with an enlarged diameter, outwardly opening bore 35 bounded inwardly by an annular transverse shoulder 36 are provided to apply the desired inserting force on the Ortman key.

Assuming an Ortman key 12 has been inserted in the bore 27 of the alignment rod 25 and the assembled alignment rod 25 and guide member 18 are mounted on the head plate flange 17 of the rocket motor assembly 11 with the axis of the alignment rod bore 25 and guide member 22 disposed tangentially to the coupling slot 13, the alignment nut 30 is first threaded onto the alignment rod 25, and the installer plate 31 is inserted in centered relation in the outer end of the diametric slot 28 in the alignment rod 25 and shifted axially along the rod into abutment with the outer end of the Ortman key 12. While the installer plate 31 is held centered in the slot 28, the pressure nut 32 is threaded onto the alignment rod 25 until the installer plate 31 is accommodated within the enlarged bore 35 thereof. Further rotation of the pressure nut 32 on the external threads 26 of the alignment rod 25 in a direction to advance the pressure nut toward the guide member 18 will bring the annular transverse shoulder 36 at the base of the enlarged bore 35 into abutment with tthe rear edge portions of the installer plate 31 projecting beyond the periphery of the alignment rod 25 and cause the installer plate 31 and the Ortman key 12 in abutment therewith to be translated axially along the bore 27 of the alignment rod in an inserting direction, the installer plate 31 being held against rotation by the diametric slot 28. The alignment nut 32 is advanced intermittently or continuously axially along the alignment rod 25 during advancing of the pressure nut 32 to maintain the alignment nut at some point intermediate the pressure nut 32 and the boss 20 to prevent the alignment rod 25 from separating along the diametric slot 28 due to pressure applied by the pressure nut 32 on the Ortman key. By this arrangement, the installer plate 31 transmits a direct force on the Ortman key 12 from the pressure nut 32 as the pressure nut is turned along the alignment rod 25 toward the alignment rod guide 18, the installer plate 31 being retained and directed by the pressure nut 32 and the diametric slot 28 formed in the alignment rod 25. Since the diameter of the bore 27 in the alignment rod 25 closely conforms to the diagonal cross section dimension of the Ortman key, the Ortman key is restrained against bending, buckling or otherwise deforming out of its normal rectilinear alignment, thus assuring that the Ortman key will be properly and effectively driven into the coupling slot 13 to interlock the rocket motor case 16 and head plate 17 together.

For static firing tests or similar uses of the rocket motor, the rear or outer end portion of the Ortman key 12 may be left exposed so that the key can be subsequently withdrawn from the coupling slot 13 to permit removal of the head plate 17a and reloading of the motor case 16. In such cases, the Ortman key 12 will be provided with a notch 12a near its outer end, and operation of the pressure nut 32 to insert the Ortman key into the coupling slot will be stopped when the notch 12a is a sufficient distance outwardly of the boss 20 and inner end of the slot 28 to permit the pressure nut 32 to be wholly located between the notch 12a and the lock nut 29. To retract the Ortman key 12 from the coupling slot 13, the pressure nut 32 and installer plate 31, and if desired the alignment nut 30, are removed from the alignment rod 25, and the pressure nut 32 is reversed and threaded onto the alignment rod 25 with its extension 34 and bore 35 facing outwardly or to the left of FIGURE 1. When the pressure nut 32 is run down fully to a position adjacent the lock nut 29 and boss 20, a retractor plate 37 similar to the installer plate 31 but having a recess 38 extending inwardly from one transverse edge interrupted by a tooth 39, is inserted in the slot 28 of the alignment rod 25 and the tooth 39 interfitted in the notch 12A, as illustrated in FIGURE 4. When the pressure nut 32 is then turned in a direction to move it outwardly along the rod 25, the annular shoulder 36 of the nut 32 will force the retractor plate 37 outwardly to withdraw the Ortman key 12 from its coupling slot 13.

If it is desired to fully introduce the Ortman key 12 into the coupling slot so that no part of the key projects from the rocket motor assembly, either a T-shaped or similarly constructed installer plate having a long nose to project down the alignment rod bore 27 and guide member bore 23 into the entrance end 15a of the coupling slot where travel of the plate is stopped by the inner end of the slot 28, should be used to drive the outer end of the Ortman key into the coupling slot, or a spacer section of key stock should be used with the rectangular installer plate 31.

Figure 6:
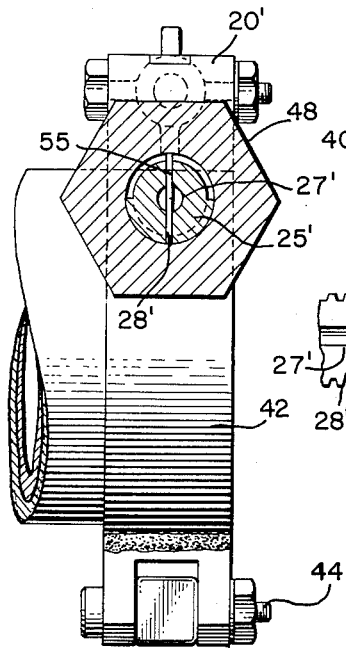
FIGURE 6 is a vertical transverse section view taken along the line 6—6 of FIGURE 5.
Figure 7:
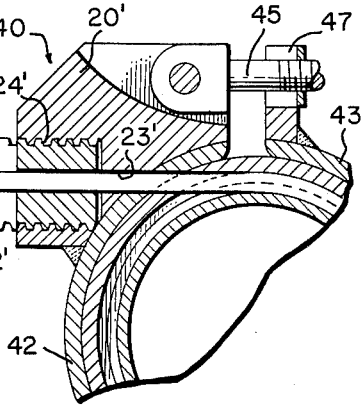
FIGURE 7 is a fragmentary vertical longitudinal section view of the apparatus of FIGURE 5 conditioned to effect removal of the Ortman key.

Another embodiment of an Ortman key installer and retractor apparatus embodying the present invention is illustrated in FIGURES 5, 6 and 7, and is designated generally by the reference character 40. In the ensuing description, those components which correspond substantially to components of the first-described embodiment will be designated by reference characters which are the primes of the reference characters used in the description of the first embodiment. The installer and remover apparatus 40 employs a split collar construction 41 for securing the unit on the outer of the two members to be intercoupled by an Ortman key, the split collar construction includinng a pair of arcuate collar sections 42 and 43 pivotally intercoupled at their lower ends by a pivot pin 44, the collar sections 42 and 43 defining a generally cylindrical collar having a diameter corresponding substantially to the diameter of the member on which it is to be mounted. A boss 20' is fixed on the upper end portion of the collar section 42, as by welding or the like, and includes a bore 22' having an internally threaded enlarged diameter section 24' to receive a threaded alignment rod 25' and a constricted bore section 23' having a diameter corresponding substantially to the diagonal cross-sectional dimension of the Ortman key 12'. A latch bolt 45 is pivotally mounted on the boss 20' and has a knob 46 threaded on the end thereof, the latch bolt 45 being adapted to be drawn into a slot of a bifurcated lug 47 fixed on the upper end of the companion collar section 43. The alignment rod 25' is identical to the alignment rod 25 and includes external threads 26', an elongated bore 27' extending therethrough and a diametric slot 28' extending from the outer end of the rod 25' to a point near the outer surface of the boss 20'. A lock nut 29' similar to the lock nut 29 is provided to restrain the alignment rod 25' in position in the bore 24'. Also a pressure nut 48 similar in construction to the pressure nut 32 is threaded onto the rod 25' but is provided with a central internally threaded bore 49 and oppositely facing enlarged diameter sockets 50 and 51 having slip rings 52 at the inner limits of the sockets 50, 51 butting against the transverse shoulders 53 forming the transition surface between the enlarged diameter sockets and the threaded central bore 49. The inwardly facing socket 50 is designed to accommodate the flat rectangular head portion 54 of an installer member or slide 55 having an elongated axially projecting extension 56 of sufficient length to project into the coupling slot 13' when the inner edges of the head 54 abut the lock nut 29'. The installer member 55 operates in exactly the same manner as the installer plate 31 of the previously described embodiment, except that, due to the extension 56 thereon, the Ortman key 12' is wholly inserted into the coupling slot 13'. If it is desired to leave the Ortman key 12' in a condition in which it can be subsequently withdrawn from the coupling slot 13', the advancing movement of the pressure nut 48 and installer member 55 is terminated at a point spaced further outwardly along the alignment rod 25' so that the transverse opening 12'a, which is provided in the Ortman key for use with the retracting means of this embodiment instead of the notch 12a of the previous embodiment, remains a sufficient distance from the entrance end of the coupling slot to permit the pressure nut 48 to be located between the transverse opening 12'a and the lock nut 29'. To retract the Ortman key, the pressure nut 49 is backed off of the alignment rod 25', the installer member 55 is removed from the slot 27', and the pressure nut 48 is replaced on the alignment rod 25' and turned down until the entrance end of the socket 51 is located inwardly of the transverse opening 12'a in the outer end of the Ortman key. A removal pin 57 of a length corresponding substantially to the diameter of the socket 51 is then inserted in the slot 27' of the alignment rod 25' and through the transverse opening 12'a in the Ortman key. Thereupon, turning of the pressure nut 48 in a direction to shift it outwardly along the alignment rod 25' will bring the slip ring 52 in the socket 51 into engagement with the projecting ends of the removal pin 57 and thereupon translate the removal pin 57 and Ortman key 12' outwardly along the alignment rod 25' to withdraw the Ortman key from the coupling slot.

It will be apparent that both of the embodiments of the Ortman key installer and remover apparatus hereinafter described provides a simple and effective device for applying continuous, even pressure to an Ortman key while rigidly confining the portions of the Ortman key projecting from the coupling slot in a rectilinear bore whose axis is disposed along a tangent of the coupling slot to restrain the Ortman key against buckling or other undesirable deformation. In this manner, an effective Ortman key type of interlock can be produced for pressure vessels of all types or other devices wherein an annular interlock which extends continuously about the circumference of a coupling slot is desired. By this construction, the dangers incident to percussive driving or hammering of an Ortman key into the coupling slot are avoided, and the apparatus facilitates withdrawing of the Ortman key from the coupling slot if it was not wholly inserted therein in a simple and effective manner. This provides particular advantages when Ortman key coupling assemblies are desired for rocket motors or like devices which would incorporate a highly combustible propellant charge when the Ortman key is being installed. In the case of pressure vessels, many of which have components which would be subject to fracture, misalignment or other damage, if the vessel were subject to strong impact shocks which would be occasioned by percussive driving of the Ortman key into the coupling slot, the apparatus of the present invention provides a convenient facility for installing or removing the Ortman key without exposing the pressure vessel components to such possible damage.

While but two preferred examples of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for driving an Ortman key or the like through a coupling slot therefor extending at least in part along a curved path in a coupling structure comprising an externally threaded rectilinear guide rod having an axial guide bore opening through an inner end thereof of sufficient length to accommodate an Ortman key therein and of a diameter to snugly accommodate the Ortman key for sliding movement therein, the guide rod having a diametrical guide slot of smaller width than the minimum transverse dimension of the Ortman key extending through the major part of the length of the guide rod, means for securely mounting said guide rod on the coupling structure at a position disposing the bore of the guide rod along a tangent of the curved path of the coupling slot with one end of the guide rod located near said curved path, a rotary drive member threaded onto said guide rod having an annular shoulder lying in a plane substantially transverse to the guide rod axis, and a slide member in driving engagement with an outer end of the Ortman key extending transversely entirely through said guide slot and having end portions projecting into the path of the annular shoulder of said rotary drive member to be engaged by said annular shoulder and driven axially of the guide rod upon rotation of the drive member and constrained against rotation by the walls of said guide slot whereby the Ortman key will be driven axially of the guide rod bore and along the coupling slot while being constrained against distortion radially of the guide rod axis by the walls of the guide rod bore.

2. Apparatus for driving a normally rectilinear Ortman key or the like through a coupling slot therefor having arcuately curved portions and extending into each of two components of a coupling, comprising a rectilinear hollow guide rod of a length to accommodate an Ortman key, the guide rod having external threads along the length thereof, an axial guide bore extending throughout its length for slidably supporting the Ortman key therein while restraining the Ortman key against transverse deformation during transit through the guide bore, and a diametrical guide slot of smaller width than the minimum transverse dimension of the Ortman key extending through the major part of the length of the guide rod, a mounting bracket having means for removably securing the mounting bracket on an external surface of one of the coupling components and threaded socket means for receiving and supporting an end portion of the guide rod with the guide rod bore disposed along a tangent of a curved portion of the coupling slot, a rotary drive member threaded onto said guide rod having an annular drive shoulder lying in a plane substantially transverse to the guide rod axis, and a slide member in driving engagement with an outer end of the Ortman key extending transversely entirely through said guide slot and having end portions projecting into the path of the annular drive shoulder of said rotary drive member to be engaged by said drive shoulder and driven axially of the guide rod upon rotation of the drive member while being constrained against rotation by the walls of said guide slot whereby the Ortman key will be driven axially of the guide rod bore and along the coupling slot and constrained against distortion radially of the guide rod axis by the walls of the guide rod bore.

3. Apparatus for driving a normally rectilinear Ortman key or the like through a coupling slot therefor having arcuately curved portions and extending into each of two components of a coupling, comprising a rectilinear hollow guide rod of a length to accommodate an Ortman key, the guide rod having external threads along the length thereof, an axial guide bore extending throughout its length for slidably supporting the Ortman key therein while restraining the Ortman key against transverse deformation during transit through the guide bore, and a diametrical guide slot of smaller width than the minimum transverse dimension of the Ortman key extending through the major part of the length of the guide rod, removable mounting means including a saddle portion, means for removably securing the latter in a fixed position against the exterior surface of one of the components of the coupling and an extension on said saddle portion having means for receiving an end of the guide rod and rigidly supporting the same with the guide rod bore extending along a tangent of a curved portion of the coupling slot, a rotary drive nut threaded onto said guide rod for rotary and axial movement having an annular drive shoulder lying in a plane substantially transverse to the guide rod axis, and a slide member in driving engagement with an outer end of the Ortman key extending transversely entirely through said guide slot and having end portions projecting into the path of the annular drive shoulder of said rotary drive member to be engaged by said drive shoulder and driven axially of the guide rod upon rotation of the drive member while being constrained against rotation by the walls of said guide slot whereby the Ortman key will be driven axially of the guide rod bore and along the coupling slot and constrained against distortion radially of the guide rod axis by the walls of the guide rod bore.

4. Apparatus for installing an Ortman key or the like in a coupling slot extending along a curved path and formed by mating grooves adjacent surfaces of inner and outer coupling components to be interlocked together wherein the outer component has an outwardly opening access slot communicating with the coupling slot, the apparatus comprising a hollow elongated, rectilinear guide rod of sufficient length to accommodate an Ortman key therein having external threads along the length thereof, the guide rod having an axial guide bore extending throughout its length whose diameter corresponds substantially to the diagonal cross-sectional dimension of the Ortman key to slidably support the Ortman key against deformation transversely thereof and a diametrical guide slot extending transversely through the guide rod and axially along substantially the entire length thereof, a guide rod mounting bracket having an internally threaded socket for threadedly receiving an inner end portion of the guide rod therein and rigidly supporting the guide rod therefrom and an exit bore forming a continuation of and communicating with the guide rod bore, means for securely affixing the mounting bracket on the outer coupling member at a point disposing said guide rod and exit bore in alignment with said access slot and along a tangent of the curved path of the coupling slot, a drive nut having an internally threaded bore threadedly coupled onto said guide rod and including an end formation having an outwardly opening socket of greater diameter than the guide rod bottomed by an annular bottom surface transverse to the guide rod axis and surrounded by a circumferential flange wall, and a slide member having an intermediate portion disposed in said guide rod bore to butt against an end of the Ortman key and thin web portions projecting outwardly through said diametrical slot to exposed positions in the path of said bottom surface to be engaged thereby and driven axially of the guide rod in a direction to advance the Ortman key into its coupling slot upon rotation of the drive nut on the guide rod threads.

5. Apparatus for installing an Ortman key as claimed in claim 4 wherein said mounting bracket includes an arcuate plate adapted to overlie and bear upon an exterior surface adjacent said access slot and having a slot to be disposed in registry with said access slot, fastening means for removably securing said arcuate plate against the outer coupling component, and a boss projecting from said arcuate plate having said socket and exit bore therein to be disposed in axial alignment with a tangent of the curved path of the coupling slot adjacent said access slot.

6. Apparatus for installing an Ortman key as claimed in claim 4 wherein said mounting bracket includes a split collar clamp having a pair of arcuate collar sections pivoted together at one end and releasable means at the other end of said collar sections for securing the collar clamp in encircling relation to the coupling components, one of said collar sections having a boss adjacent the other end thereof projecting outwardly from the collar section and having said socket and exit bore therein to be disposed in axial alignment with a tangent of the curved path of the coupling slot adjacent said access slot.

References Cited in the file of this patent

UNITED STATES PATENTS

| | | |
|---|---|---|
| 1,899,343 | Mackey et al. | Feb. 28, 1933 |
| 2,756,484 | Booth | July 31, 1956 |